United States Patent
Eybergen et al.

(10) Patent No.: US 9,932,983 B2
(45) Date of Patent: Apr. 3, 2018

(54) LOW INERTIA LAMINATED ROTOR

(71) Applicant: EATON CORPORATION, Cleaveland, OH (US)

(72) Inventors: William Nicholas Eybergen, Harrison Twp., MI (US); Michael Lee Killian, Troy, MI (US); Matthew James Fortini, Allen Park, MI (US)

(73) Assignee: Eaton Intelligent Power Limited (IE)

( * ) Notice: Subject to any disclaimer, the term of this patent is extended or adjusted under 35 U.S.C. 154(b) by 112 days.

(21) Appl. No.: 14/854,283

(22) Filed: Sep. 15, 2015

(65) Prior Publication Data

US 2016/0003248 A1 Jan. 7, 2016

Related U.S. Application Data

(63) Continuation of application No. PCT/US2014/024856, filed on Mar. 12, 2014.
(Continued)

(51) Int. Cl.
*B60K 6/20* (2007.10)
*F04C 18/16* (2006.01)
(Continued)

(52) U.S. Cl.
CPC .............. *F04C 18/16* (2013.01); *F02B 33/38* (2013.01); *F02B 37/00* (2013.01); *F04C 2/084* (2013.01); *F04C 18/084* (2013.01); *F04C 18/126* (2013.01); *F04C 29/005* (2013.01); *F04C 29/0085* (2013.01); *F04C 2/16* (2013.01);
(Continued)

(58) Field of Classification Search
CPC combination set(s) only.
See application file for complete search history.

(56) References Cited

U.S. PATENT DOCUMENTS

| 885,109 A | * | 4/1908 | Truss | B63H 1/28 |
| | | | | 198/676 |
| 2,325,617 A | * | 7/1943 | Lysholm | F01C 1/084 |
| | | | | 144/221 |

(Continued)

FOREIGN PATENT DOCUMENTS

| CH | 343712 A | 12/1959 |
| DE | 15 03 663 A1 | 6/1969 |

(Continued)

OTHER PUBLICATIONS

International Search Report for International Application No. PCT/US2014/024856, dated Apr. 11, 2014.
(Continued)

*Primary Examiner* — Jesse Bogue
(74) *Attorney, Agent, or Firm* — Merchant & Gould P.C.

(57) ABSTRACT

A rotor assembly having a plurality of rotor plates mounted to a shaft, and methods of construction for a rotor assembly are disclosed. Each rotor plate in the assembly may be provided with a central opening extending between the first and second sides through which the shaft extends. In one aspect, the rotor plates are provided with a plurality of lobes extending away from the central opening, wherein each of the lobes has a lobe opening extending through the thickness of the plates. In one embodiment, the rotor plates are rotationally stacked to form a helical rotor.

21 Claims, 8 Drawing Sheets

Related U.S. Application Data

(60) Provisional application No. 61/798,137, filed on Mar. 15, 2013.

(51) Int. Cl.

| | | |
|---|---|---|
| *F04C 2/08* | (2006.01) | |
| *F04C 18/08* | (2006.01) | |
| *F02B 33/38* | (2006.01) | |
| *F02B 37/00* | (2006.01) | |
| *F04C 18/12* | (2006.01) | |
| *F04C 29/00* | (2006.01) | |
| *F04C 2/16* | (2006.01) | |
| *F04C 2/18* | (2006.01) | |

(52) U.S. Cl.
CPC ......... *F04C 2/18* (2013.01); *F04C 2230/231* (2013.01); *F04C 2240/20* (2013.01)

(56) References Cited

U.S. PATENT DOCUMENTS

| | | | |
|---|---|---|---|
| 2,362,106 A * | 11/1944 | Ungar | F04C 2/084 29/893.2 |
| 2,714,314 A | 8/1955 | Ulander | |
| 3,918,838 A | 11/1975 | Moody, Jr. et al. | |
| 4,761,124 A | 8/1988 | Timuska et al. | |
| 4,828,467 A | 5/1989 | Brown | |
| 5,011,389 A | 4/1991 | Timuska | |
| 5,165,881 A | 11/1992 | Wicen | |
| 5,290,150 A * | 3/1994 | Takahashi | F04C 18/084 416/229 R |
| 5,310,320 A | 5/1994 | Timuska | |
| 7,488,164 B2 | 2/2009 | Swartzlander | |
| 7,866,966 B2 | 1/2011 | Swartzlander | |
| 8,196,686 B2 | 6/2012 | Grieve | |
| 2006/0138894 A1* | 6/2006 | Harada | H02K 1/28 310/216.004 |
| 2008/0080996 A1 | 4/2008 | Kataoka et al. | |
| 2008/0170958 A1 | 7/2008 | Prior et al. | |
| 2008/0219877 A1 | 9/2008 | Kjeldsen et al. | |
| 2009/0016893 A1 | 1/2009 | Lee et al. | |
| 2009/0021105 A1* | 1/2009 | Evans | H02K 1/02 310/261.1 |
| 2009/0140598 A1* | 6/2009 | Schieweck | H02K 1/28 310/216.004 |
| 2012/0014823 A1* | 1/2012 | Riedl | H02K 1/30 417/423.12 |
| 2013/0015526 A1 | 3/2013 | Griess et al. | |
| 2015/0252719 A1 | 9/2015 | Pryor et al. | |
| 2017/0101989 A1 | 4/2017 | Eybergen et al. | |

FOREIGN PATENT DOCUMENTS

| | | |
|---|---|---|
| DE | 23 08 195 A1 | 8/1974 |
| GB | 409853 A | 5/1934 |
| GB | 740050 A | 11/1955 |
| JP | H03 96684 A | 4/1991 |
| JP | H04 58093 A | 2/1992 |
| JP | H06 101671 A | 4/1994 |
| JP | 2003-184758 A | 7/2003 |
| JP | 2006-233816 A | 9/2006 |
| JP | 2011-112019 A | 6/2011 |
| WO | 01/28746 A1 | 4/2001 |
| WO | WO 2013/130774 A1 | 9/2013 |
| WO | 2014/081823 A1 | 5/2014 |
| WO | WO 2014/107407 A1 | 7/2014 |
| WO | 2015/138557 A1 | 9/2015 |
| WO | 2015/184371 A1 | 12/2015 |
| WO | 2016/049514 A1 | 3/2016 |

OTHER PUBLICATIONS

Written Opinion for International Application No. PCT/US2014/024856, dated Apr. 11, 2014.

* cited by examiner

LOW INERTIA LAMINATED ROTOR

RELATED APPLICATION

This application is being filed on 12 Mar. 2014, as a PCT International Patent application and claims priority to U.S. patent application Ser. No. 61/798,137, filed on 15 Mar. 2013, which is incorporated herein by reference in its entirety.

TECHNICAL FIELD

This present disclosure relates to rotor assemblies that may be utilized in rotary equipment applications, for example, volumetric expansion and compression devices.

BACKGROUND

Rotors are a commonly used in applications where it is desirable to compress or move a fluid and where it is desired to remove energy from the fluid. In one example, a compressor or supercharger utilizes a pair of rotors to increase airflow into the intake of an internal combustion engine. In another example, a volumetric fluid expander includes a pair of rotors that expand a working fluid to generate useful work at an output shaft. In such applications, it is known to provide machined or cast rotors having a unitary construction with a solid cross-sectional area. Improvements are desired.

SUMMARY

The disclosure is directed to a rotor assembly comprising a plurality of rotor plates mounted to a shaft. In one aspect, each of the rotor plates has a first side and a second opposite side separated by a first thickness. Each rotor plate may also be provided with a central opening extending between the first and second sides through which the shaft extends. In yet another aspect, the rotor plates are provided with a plurality of lobes extending away from the central opening, wherein each of the lobes has a lobe opening extending between the first and second sides. The plurality of rotor plates are stacked and secured together to form the rotor assembly such that at least one of the first and second sides of one rotor plate is adjacent to and in contact with at least one of the first and second sides of another rotor plate. In one embodiment, the rotor plates are stacked directly upon each other such that the entirety of one side of one rotor plate is entirely covered by an adjacent rotor plate. In one embodiment, the rotor plates are rotationally stacked to form a helical rotor such that one rotor plate does not entirely cover the adjacent rotor plate. The disclosure also includes a volumetric fluid expander and a compressor or supercharger including a pair of the above described rotors.

The disclosure also is directed to a process for making a laminated rotor assembly. In one step of the process a plurality of rotor plates are provided in accordance with the above description. In one step, the rotor plates are stacked together to form either a straight rotor or a helical rotor. In one step, the rotor plates are secured together, for example by welding. In one step, the rotor is mounted to a shaft to form the laminated rotor assembly. The shaft may be burred to better engage the shaft with the stacked rotor plates. The process may also include applying an abradable coating to the rotor as well.

The above features and advantages and other features and advantages of the present teachings are readily apparent from the following detailed description of the best modes for carrying out the present teachings when taken in connection with the accompanying drawings.

DETAILED DESCRIPTION

Figure 1:
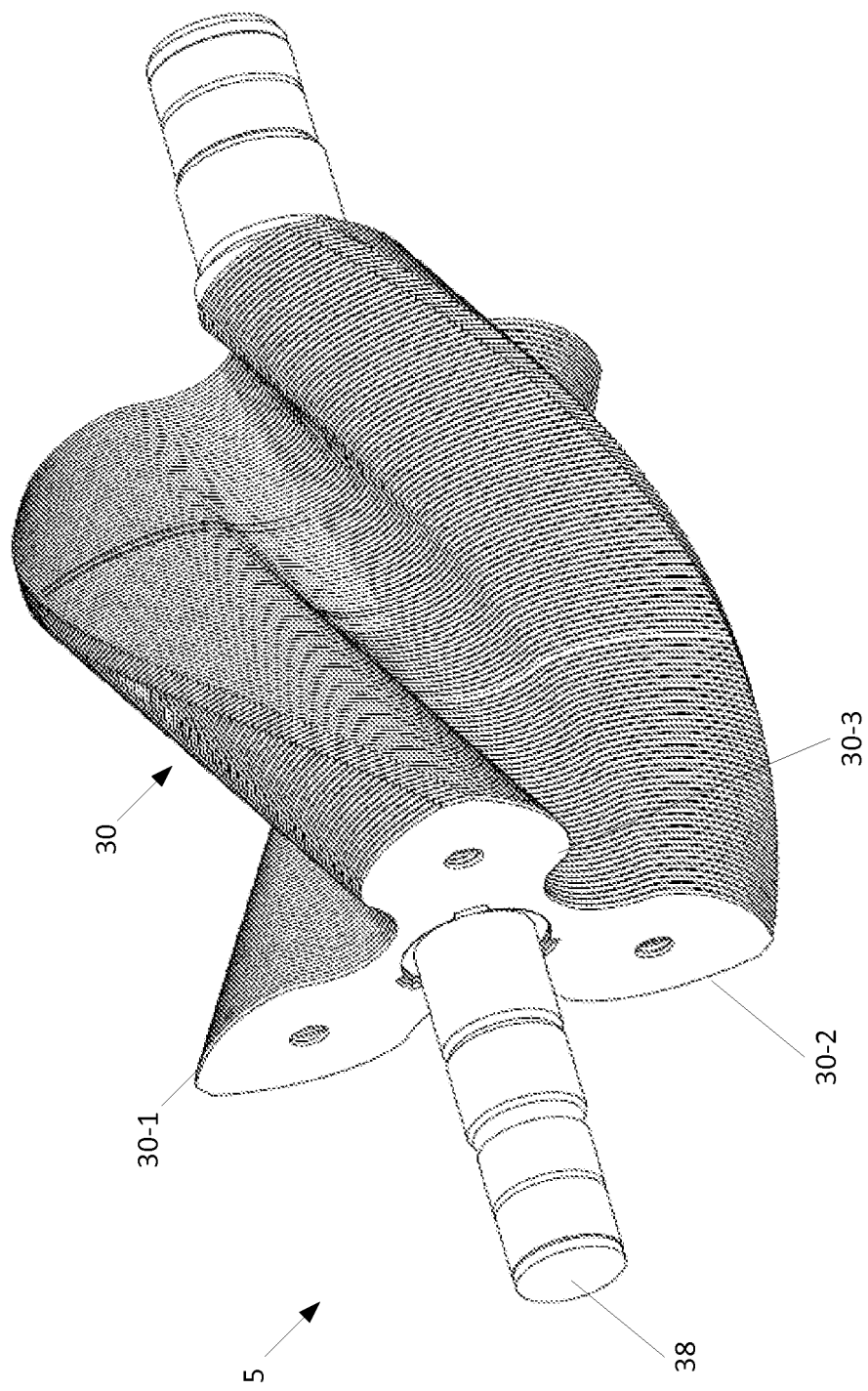
FIG. 1 is a perspective view of a low inertia laminated rotor assembly in accordance with the principles of the present disclosure.
Figure 3:
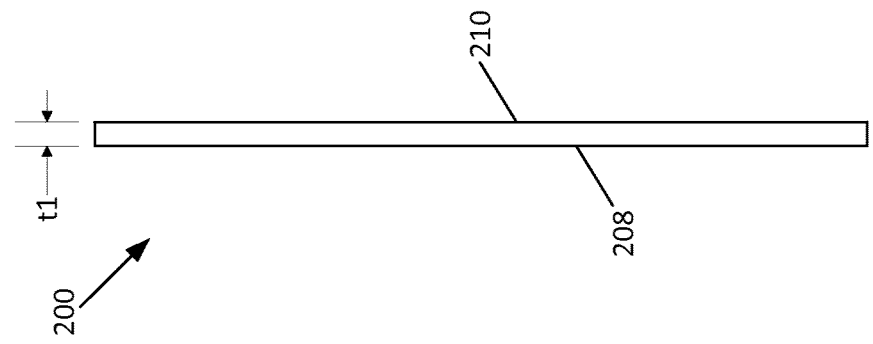
FIG. 3 is a side view of the rotor plate shown in FIG. 2.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims. Referring to the drawings wherein like reference numbers correspond to like or similar components throughout the several figures.

Rotor Construction

Referring to FIG. 1, a complete laminated rotor assembly 5 is presented. As shown, laminated rotor 30 includes a plurality of stacked rotor plates 200 that are mounted to a common shaft 38. In the embodiment shown, the rotor plates 200 are rotationally stacked such that the rotor assembly 30 has a helical rotor having a constant helix angle. By use of the term "rotationally stacked," it is meant that the plates are rotationally offset with respect to each other such that one rotor plate does not entirely cover an adjacent rotor plate. The laminated rotor 30 can also be provided as a straight rotor by stacking the rotor plates 200 such that adjacent plates 200 completely cover each other.

Examples of a rotor plate 200 are shown at FIGS. 2-5. As shown, rotor plate 200 has three radially spaced lobes 202-1, 202-2, 202-3 (collectively referred to as lobes 202) extending away from a central axis X to a respective tip portion 203-1, 203-2, 203-2 (collectively tips 203). In one aspect, the lobes 202 have or define a convex outline and the root portions 204 have or define a concave outline that together define an outer perimeter 206 of the rotor plate 200.

As shown, the lobes 202 are equally spaced apart by adjacent root portions 204-1, 204-2, 204-3 (collectively referred to as root portions 204) at a first separation angle a1. In the embodiment shown, the separation angle a1 is about 120 degrees. Although three lobes are shown, it should be understood that fewer or more lobes may be provided with corresponding separation angles, for example, two lobes with a separation angle of 180 degrees, four lobes with a separation angle of 90 degrees, five lobes with a separation angle of 72 degrees, and six lobes with a separation of 60 degrees. When stacked together to form a rotor 30, the central axis X of each rotor plate 200 is coaxial with axis X1, X2, respectively.

Each rotor plate 200 also has a first side 208 and a second side 210 separated by a first thickness t1. In one embodiment, the thickness t1 is about 0.25 millimeters (mm). However, it should be noted that other thicknesses may be used; for example, thicknesses between about 0.1 mm and about 1 mm and between about 0.1 mm and about 0.5 mm. Each plate 200 is also shown as being provided with a central opening 212 extending between the first and second sides 208, 210, wherein the central opening 212 is centered on the central axis X.

Figure 2:
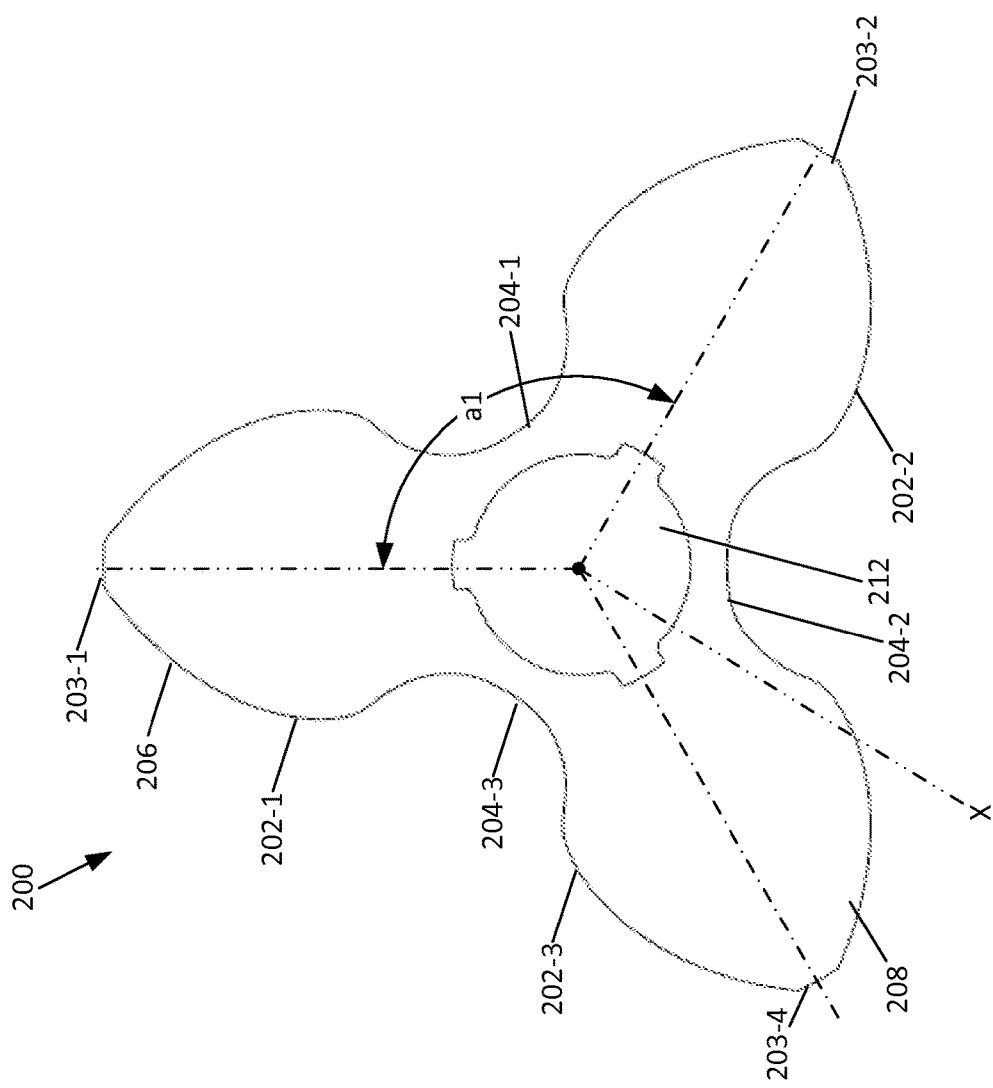
FIG. 2 is a top view of a rotor plate usable in the rotor assembly shown in FIG. 1.

With reference to the rotor plate 200 shown at FIG. 2, it can be seen that the lobes 202 are entirely solid material such that the only opening that extends through the thickness t1 of the rotor is the central opening 212. This type of lobe may be referred to as a solid lobe and a rotor plate having such lobes may be referred to as a solid-lobe rotor plate. However, the rotor plate 200 may be provided with one or more openings within each lobe. This type of lobe may be referred to as a hollow lobe and a rotor plate having such lobes may be referred to as a hollow-lobe rotor plate.

Figure 4:
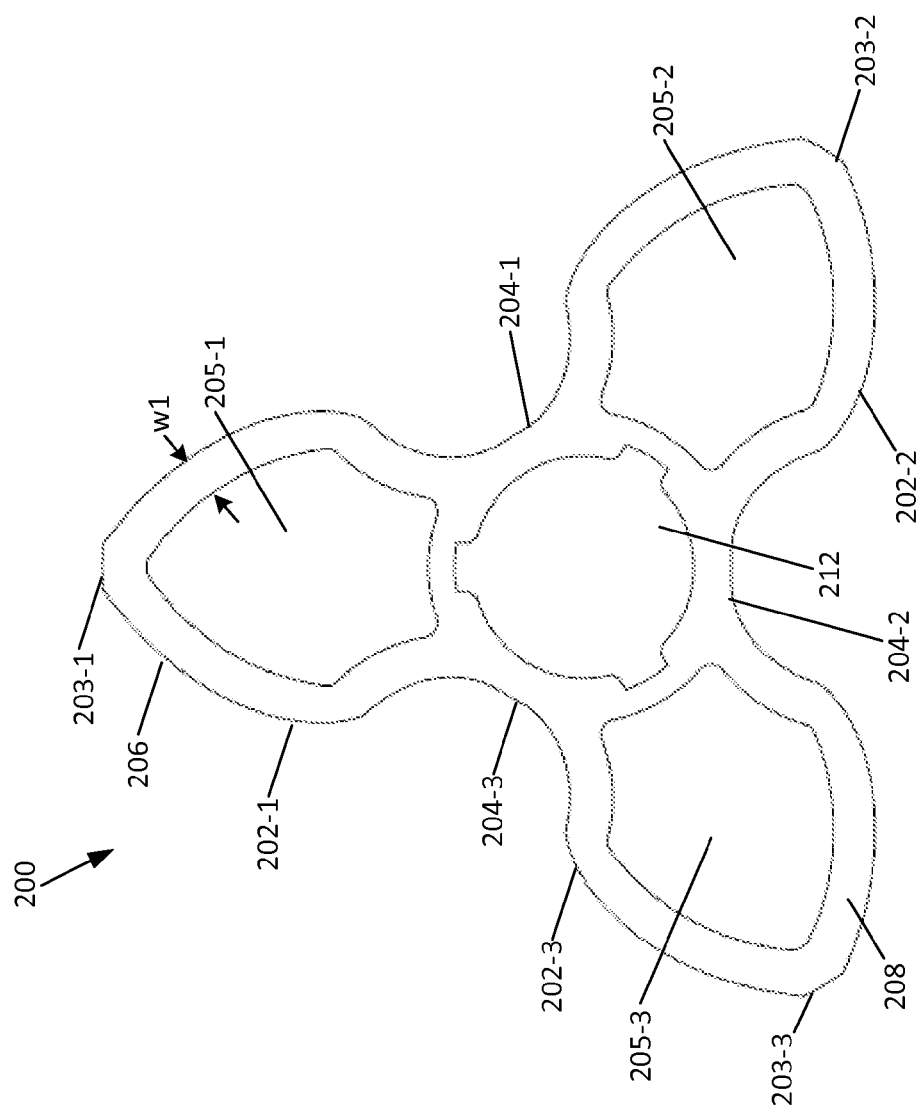
FIG. 4 is a top view of a rotor plate usable in the rotor assembly shown in FIG. 1.
Figure 5:
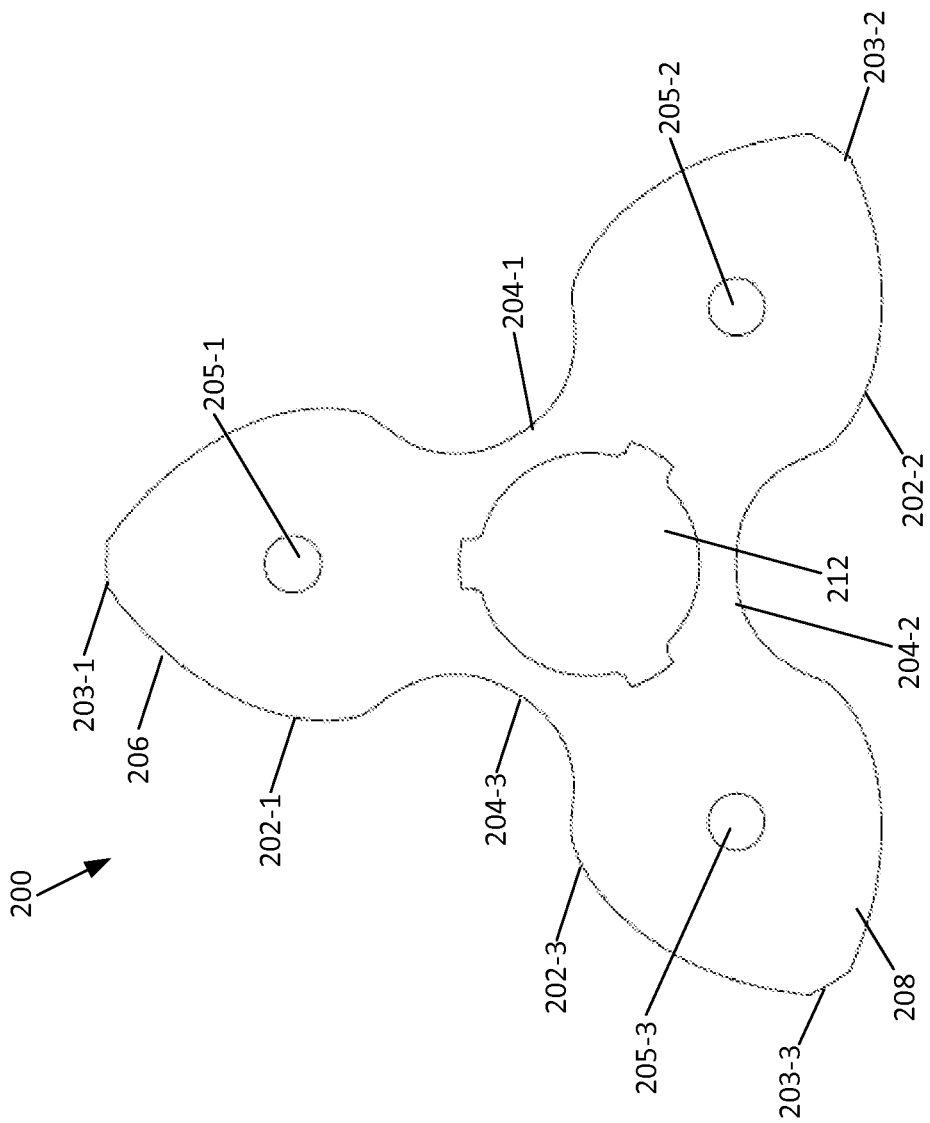
FIG. 5 is a top view of a rotor plate usable in the rotor assembly shown in FIG. 1.

Referring to FIG. 4, an example of a hollow-lobe rotor plate 200 is shown in which each lobe 202 is provided with a respective opening 205-1, 205-2, 205-3 (collectively openings 205). In one aspect, each opening 205 has an area that is the majority of the surface area of the lobe 202, as defined by the outer perimeter of the lobe 202. In one aspect, the total opening area defined by the openings 205 and the central opening 212 is greater than the total area defined by the outer perimeter 206 of the rotor plate 200. In one aspect, the openings 205 are configured such that the remaining material of the lobe 202, adjacent the outer perimeter 206 and proximate the tip portion 203, has a generally constant width w1. Near the root portions 204, the material width is shown as being increased from the first width w1 for greater strength.

In the embodiment shown at FIG. 4, the total opening area of the openings 205 and central opening 212 is about 50% of the total area defined by the outer perimeter 206 resulting in a rotor plate 200 that has about 50% less material, as compared to a solid-lobe rotor with the same central opening size. The size and configuration of the openings 205 in the rotor plate 200 can be configured to result in a total opening area ranging from 0% to 70% of the total perimeter area, and preferably between about 30% and about 60% of the total perimeter area. Stated in other terms, the size and configuration of the openings 205 in the rotor plate 200 can be configured to result in a total material reduction ranging from 0% to about 70%, and preferably between about 30% and about 60% of the total perimeter area.

Figure 10:
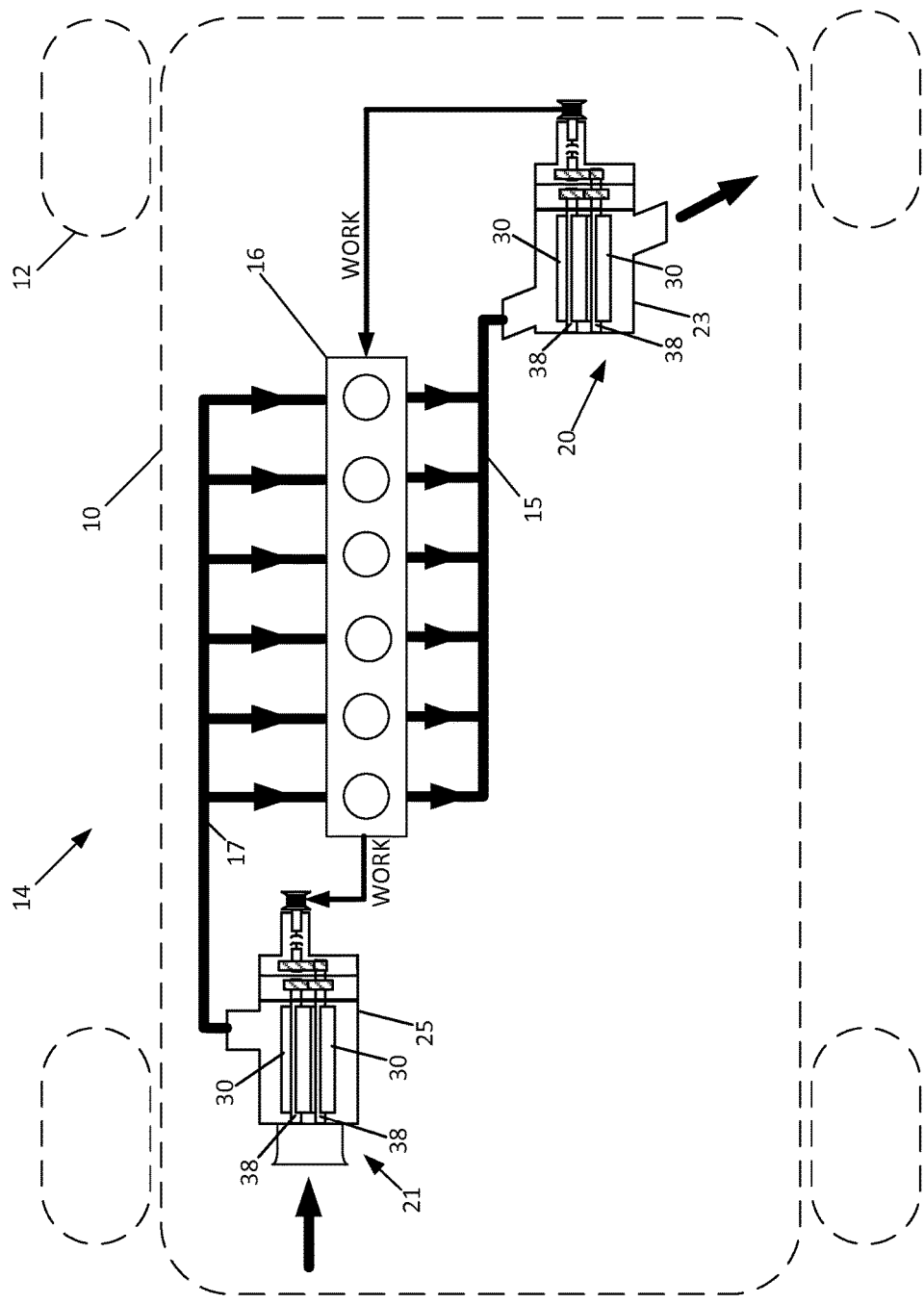
FIG. 10 is a schematic view of a vehicle having a fluid expander and a compressor in which rotor assemblies of the type shown in FIG. 1 may be included.

The provision of an opening 205 in the lobe 204, as shown in FIG. 10, substantially reduces the amount of material required to form the rotor 30. Accordingly, the weight of the rotor plate 200, and thus the weight of the rotor 30 is significantly less as compared to a solid rotor or a laminated rotor using solid-lobe plates. As importantly, the moment of inertia or rotational inertia of the rotor plate 200, and thus the assembled rotor 30, is substantially reduced as compared to a solid material rotor. In the embodiment shown, the rotational inertia of the rotor plate 200 and rotors 30 is about 45% less than a solid rotor made of the same material and having the same geometric configuration. The size and configuration of the openings 205 in the rotor plate 200 can be configured to result in a reduction of rotational inertia, as compared to a solid rotor, ranging from 0% to about 45% and preferably between about 25% to 55%.

With reference to FIG. 11, the openings 205-1, 205-2, 205-3 are provided as smaller circular openings that can be used for the purpose of determining the geometric center of the rotor plate 200 during assembly. Although the rotor plate 200 shown in FIGS. 10 and 11 is shown with one opening 205 in each lobe 202, more than one opening may be provided in each lobe as desired, for example, two, three, or four openings 205 in each lobe 202.

As the mass of the rotor 30 is reduced when constructed from at least some hollow-lobe rotor plates 200, the rotor plates 200 can be made from a material that is sufficient to maintain structural integrity under high temperature and loads, such as would be the case where a volumetric fluid expander 20 (discussed later) having rotor assemblies 5 receives direct exhaust from an internal combustion engine. In some examples, each of the rotor plates 200 is fine blanked, stamped, or laser or water jet cut from a thin sheet of metal, such as stainless steel, carbon steel or aluminum. The material can be pre-coated using a silk screen process with copper or nickel.

Rotor Assembly Method 1000

Figure 8:
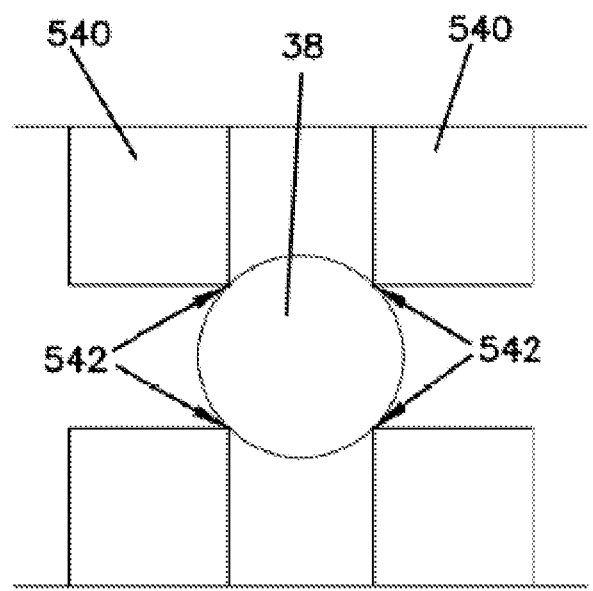
FIG. 8 is an end view of the shaft shown in FIG. 7 in a die forming process.
Figure 9:
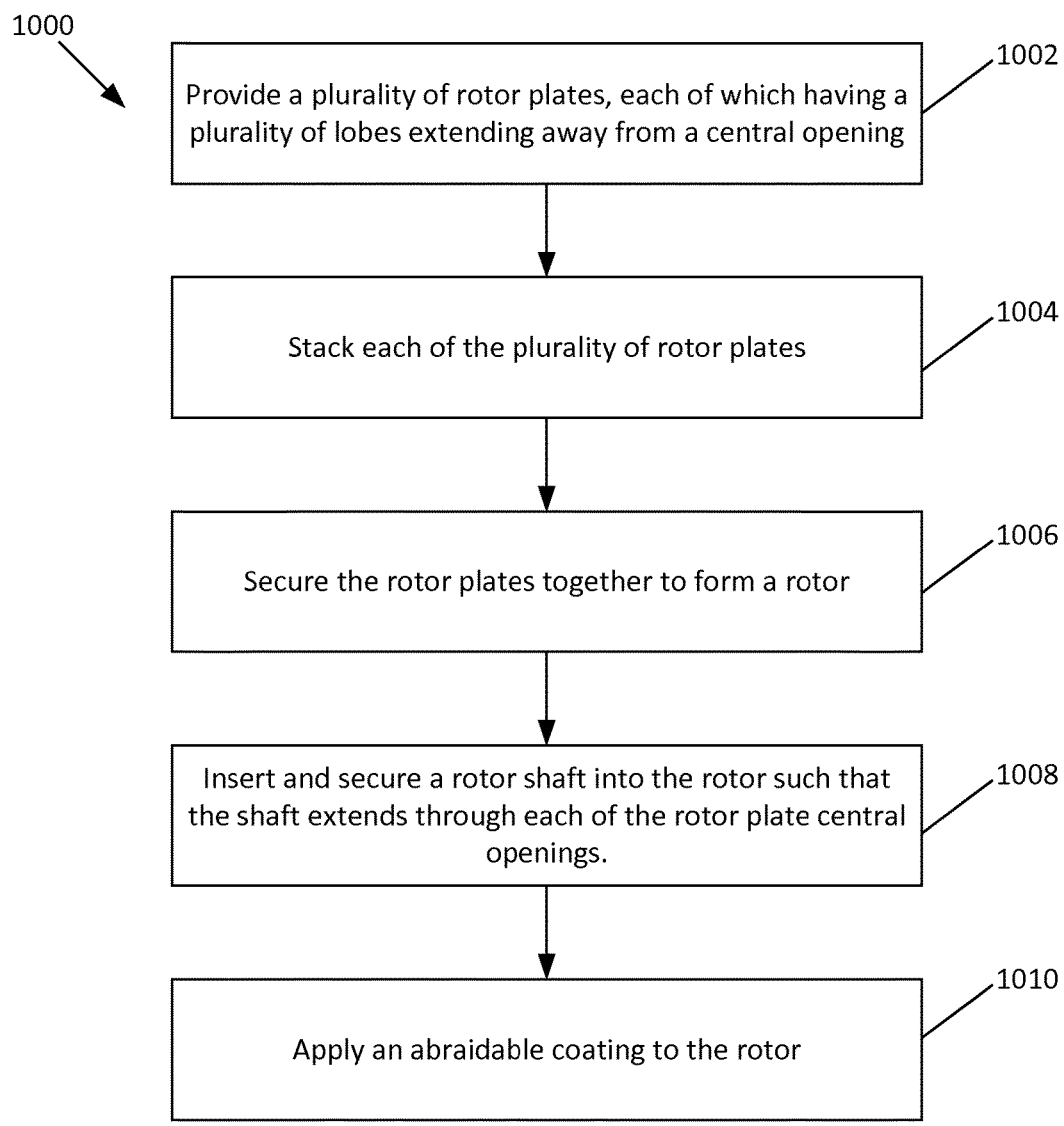
FIG. 9 is a schematic showing a process for producing a laminated rotor.

Referring to FIG. 9, an example of a rotor assembly system and process 1000 in accordance with the disclosure is presented. It is noted that although the figures diagrammatically show steps in a particular order, the described procedures are not necessarily intended to be limited to being performed in the shown order. Rather at least some of the shown steps may be performed in an overlapping manner, in a different order and/or simultaneously. Also, the process shown in FIG. 8 is exemplary in nature and other steps or combinations of steps may be incorporated or altered without departing from the central concepts disclosed herein.

In a step 1002, a plurality of rotor plates 200 in accordance with the above description are provided. In a step 1004, each of the provided rotor plates 200 is stacked such that at least a portion of one of the rotor plate sides 208, 210 is adjacent and in contact with another rotor plate side 208, 210. In the embodiment shown, the sides 208, 210 of each rotor plate 200 are completely planar such that, when stacked, no gap exists between adjacent rotor plates. As presented, each rotor plate 200 is slightly offset from the adjacent rotor plate about the central axis X to form a helical rotor 30.

It is noted that other configurations of stacked rotor plates 200 are possible. For example, the stack could consist entirely of hollow-lobe rotor plates of the type shown in FIG. 3. Alternatively, the stack could include closed-lobe rotor plates of the type shown in FIG. 2 at each end with hollow-lobe rotor plates of the type shown in FIG. 3 there between. In even yet another configuration, the stack could include alternating hollow-lobe rotor plates with solid-lobe rotor plates. Alternatively, the stack could include a majority of the plates as being hollow-lobe rotor plates with solid-lobe rotor plates being inserted incrementally throughout the stack, for example, every tenth plate could be a solid-lobe rotor plate with the remaining plates being a hollow-lobe type.

Figure 6:
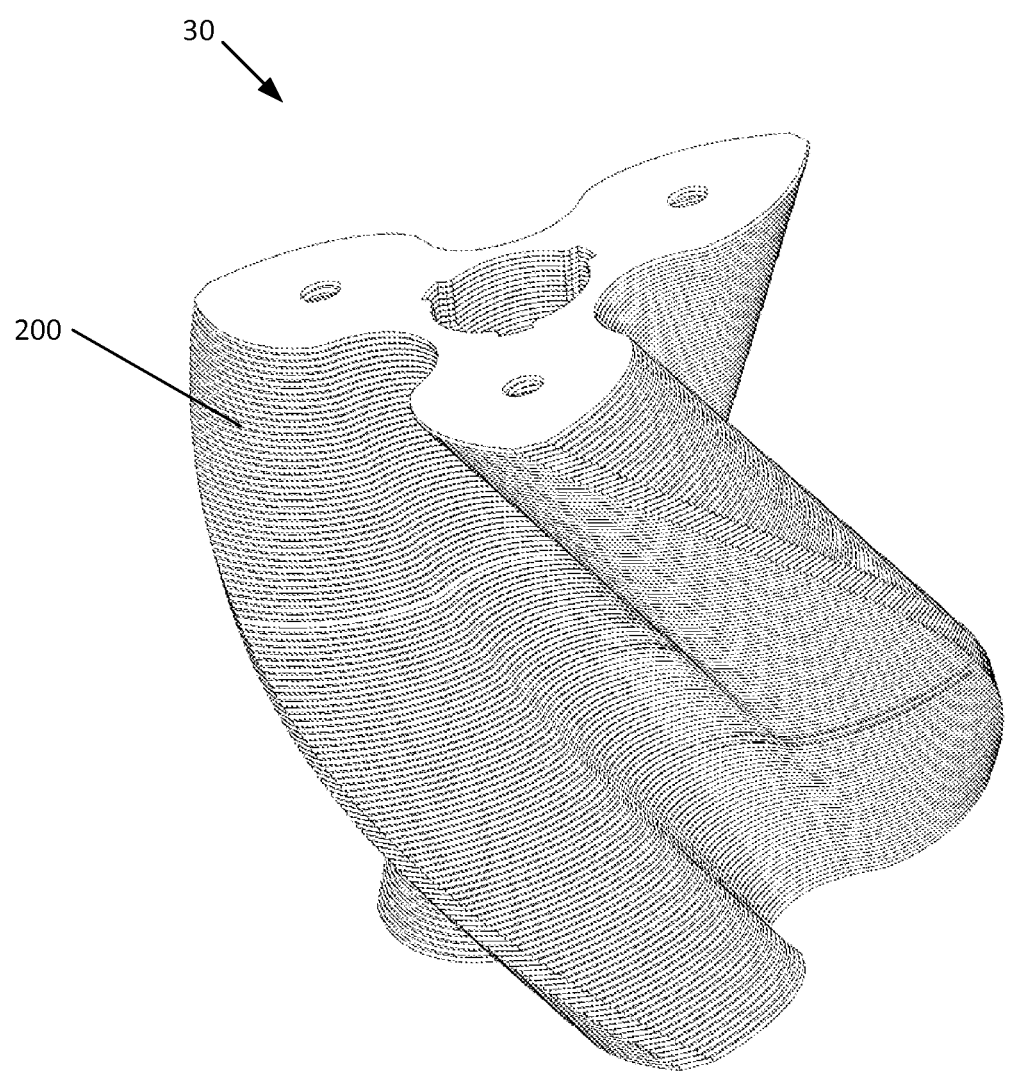
FIG. 6 is a perspective view of the unitary rotor with the shaft removed.

In a step 1006, the rotor plates 200 are secured together. The stacked rotor plates 200 can be secured together, for example by welding. In one example, the plates 200 are secured together by laser welding. In another example, the rotor plates 200 can be welded together in a vacuum or continuous belt furnace. In an alternative, the plates 200 can be plated and resistive-welded together. In one embodiment, the rotor plates 200 are secured with welds that extend along the rotor plate tips 203 and along each side of the rotor lobes 202 for a total of nine helical welds that traverse the length of the rotor. Other weld configurations are possible as well, as are other attachment means, such as adhesives. FIG. 6 shows the rotor 30 after the plates have been stacked and secured together.

Figure 7:
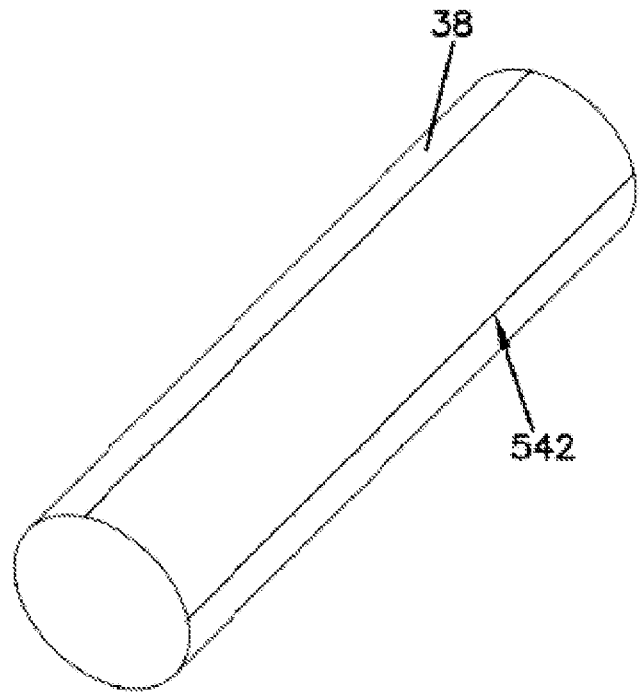
FIG. 7 is a perspective view of a shaft onto which the rotor plates of FIGS. 2-5 may be mounted.

Once the rotor plates 200 are secured together, such as by one of the above described welding processes, the rotor shaft 38 can be pressed onto the rotor 30 in a step 1008 to create the rotor assembly 5 shown at FIG. 1. In one embodiment, and as can be seen at FIGS. 7 and 8, the rotor shaft 38 is formed by a die set 540 to include a plurality of burrs 542 set at 90-degree increments about the output shaft 38. The height of the burrs 542 is set to interference fit with the central opening 212 in the plates 200 that form the rotor 30 when the shaft 38 is inserted therein. This permits power to be transferred from the rotor plates 200 to the shaft 38.

In a step 1010, a coating is applied to the rotor plates 200 of the rotor 30. In one embodiment, the coating is an abradable coating to allow tighter clearances between a pair of adjacent rotors 30, which may be especially useful in high temperature applications.

Rotor Assembly Applications

The above described rotor assembly 5 may be used in a variety of applications involving rotary devices. Two such applications are for use in a fluid expander 20 and a compression device 21 (e.g. a supercharger), as shown in FIG. 10. In one embodiment, the fluid expander 20 and compression device 21 are volumetric devices in which the fluid within the expander 20 and compression device 21 is transported across the rotors 30 without a change in volume. FIG. 10 shows the expander 20 and supercharger 21 being provided in a vehicle 10 having wheels 12 for movement along an appropriate road surface. The vehicle 10 includes a power plant 16 that receives intake air 17 and generates waste heat in the form of a high-temperature exhaust gas in exhaust 15. The power plant 16 may be an internal combustion (IC) engine or a fuel cell.

As shown, the expander 20 receives heat from the power plant exhaust 15 and converts the heat into useful work which can be delivered back to the power plant 16 to increase the overall operating efficiency of the power plant. As configured, the expander 20 includes housing 23 within which a pair of rotor assemblies 5 having intermeshed rotors 30 and shafts 38 are disposed. The expander 20 having rotor assemblies 5 can be configured to receive heat from the power plant 16 directly or indirectly from the exhaust.

One example of a fluid expander 20 that directly receives exhaust gases from the power plant 16 is disclosed in Patent Cooperation Treaty (PCT) International Application Number PCT/US2013/078037 entitled EXHAUST GAS ENERGY RECOVERY SYSTEM. PCT/US2013/078037 is herein incorporated by reference in its entirety.

One example of a fluid expander 20 that indirectly receives heat from the power plant exhaust via an organic Rankine cycle is disclosed in Patent Cooperation Treaty (PCT) International Application Publication Number WO 2013/130774 entitled VOLUMETRIC ENERGY RECOVERY DEVICE AND SYSTEMS. WO 2013/130774 is incorporated herein by reference in its entirety.

Still referring to FIG. 10, the compression device 21 is shown as being provided with housing 25 within which a pair of rotor assemblies 5 having intermeshed rotors 30 and shafts 38 are disposed. As configured, the compression device is driven by the power plant 16. As configured, the compression device 21 increases the amount of intake air 17 delivered to the power plant 16. In one embodiment, compression device 21 is a Roots-type blower of the type shown and described in U.S. Pat. No. 7,488,164 entitled OPTIMIZED HELIX ANGLE ROTORS FOR ROOTS-STYLE SUPERCHARGER. U.S. Pat. No. 7,488,164 is hereby incorporated by reference in its entirety.

Material Selection

Where the rotors 30 are disposed in a housing, such as housings 23 and 25, proper consideration must be given to material selection for the rotors and the housing in order to maintain desirable clearances between the rotors and housing. For example, improper material selection can result in a rotor that expands when heated by a working fluid (e.g. engine exhaust) into the interior wall of the housing, thereby damaging the rotor and housing and rendering the device inoperable. Proper selection of materials having appropriate relative coefficients of thermal expansion will result in a rotor that, in the expanded state, will not contact an also expanded housing and will maintain a minimum clearance between the rotors and housing for maximum efficiency across a broader range of temperatures. Also, as the rotors are more directly exposed to the working fluid (e.g. exhaust gases or a solvent used in a Rankine cycle) and the housing can radiate heat to the exterior, the rotors can be expected to expand to a greater degree than the housing. Accordingly, it is desirable to select a material for the rotors that has a coefficient of thermal expansion that is lower than a coefficient of thermal expansion of the housing.

Because the rotors can be provided with hollow lobes, a wider selection of materials having relatively low coefficients of thermal expansion may be used for the rotors because the resulting rotational inertia of a hollow-lobe rotor made from plates having a relatively high density can be the same or lower than the rotational inertia of a solid-lobe cast, machined, or laminated rotor made from a material having a relatively low density. For example, a stainless steel rotor with hollow lobes can be created with a rotational inertia generally similar to a solid-lobe aluminum rotor. As such, the disclosed rotor design allows a greater degree of material selection for the rotor which further widens the suitability of various materials for the housing.

In one particular application, the rotor assemblies 5 are used in an expander that receives exhaust gases from an internal combustion engine. In such an application, it is necessary that the rotor plates 200 be formed from a material that is suitable for operation at high exhaust gas temperatures, for example, stainless steel, tungsten, titanium, and carbon steel. As the rotors 30 can be provided with hollow lobes, these materials can be used in a high temperature expander application without resulting in a rotor 30 that has a rotational inertia that is too high for efficient operation. In one embodiment, stainless steel rotors are used in conjunction with an aluminum housing. As stainless steel has a lower coefficient of thermal expansion than aluminum, both the housing and the rotors will expand, but to a degree wherein each component expands to achieve clearances that allow for maximum efficiency. Of course, many other possibilities exist for rotor and housing materials based on desired performance criteria.

While the best modes for carrying out the many aspects of the present teachings have been described in detail, those familiar with the art to which these teachings relate will recognize various alternative aspects for practicing the present teachings that are within the scope of the appended claims.

What is claimed is:

1. A rotor assembly comprising:
   a. a housing;
   b. a first rotor assembly disposed in the housing; and
   c. a second rotor assembly disposed in the housing and intermeshed with the first rotor assembly;
   d. wherein the first and second rotor assemblies each have a rotor formed from a plurality of rotor plates including a plurality of steel sheet rotor plates, each including:
      i. a first side and a second opposite side separated by a first thickness;
      ii. a central opening extending between the first and second sides;
      iii. a plurality of lobes extending away from the central opening, each of the plurality of lobes having a convex outline and being separated by a root portion having a concave outline,
      iv. wherein the lobes of at least some of the plurality of rotor plates have a lobe opening extending between the first and second sides; and
   e. a shaft extending through the central opening of each of the plurality of rotor plates;
   f. wherein the plurality of rotor plates are stacked and secured together to form the rotor assembly such that at least one of the first and second sides of one rotor plate is adjacent to and in contact with at least one of the first and second sides of another rotor plate to form a helical rotor;
   g. wherein the rotor assembly is a volumetric fluid expansion device configured to receive gases from an internal combustion engine.

2. The rotor assembly of claim 1, wherein the rotor plates are rotated with respect to each other to form a helical rotor.

3. The rotor assembly of claim 2, wherein each of the plurality of rotor plates includes first, second, and third lobes that are radially spaced apart by an equal angular degree.

4. The rotor assembly of claim 3, wherein each of the plurality of rotor plates further includes a fourth lobe, wherein the first, second, third, and fourth lobes are radially spaced apart by an equal angular degree.

5. The rotor assembly of claim 2, wherein the helical rotor has an overall length that is generally equal to the sum of the first thicknesses of the plurality of stacked rotor plates.

6. The rotor assembly of claim 2, wherein each of the rotor plates is formed from a stainless steel metal sheet.

7. The rotor assembly of claim 6, wherein the rotor plates are secured together by welding.

8. The rotor assembly of claim 1, wherein the plurality of rotor plates includes a first end rotor plate, a second end rotor plate, and a plurality of intermediate rotor plates stacked between the first and second end rotor plates, and wherein the plurality of intermediate rotor plates have first lobe openings at each lobe and each of the first and second end rotor plates have either solid lobes or second lobe openings in each lobe having a smaller dimension than the first lobe openings.

9. The rotor assembly of claim 1, wherein each of the plurality of rotor plates has a first thickness of greater than 0.1 milimeter.

10. The rotor assembly of claim 9, wherein the first thickness is between 0.1 milimeter and 1 milimeter.

11. The rotor assembly of claim 1, wherein at least one of the plurality of rotor plates has a first area defined by the area of the central opening and the area of the at least one lobe opening that is between 30 percent and 60 percent of a second area defined by an outer perimeter of the rotor plate.

12. The rotor assembly of claim 11, wherein the first area is 50 percent of the second area.

13. A rotary device comprising:
   a. a housing;
   b. a first rotor assembly disposed in the housing; and
   c. a second rotor assembly disposed in the housing and intermeshed with the second rotor assembly;
   d. wherein the first and second rotor assemblies each have a rotor formed from a plurality of rotor plates including:
      i. a first side and a second opposite side separated by a first thickness;
      ii. a central opening extending between the first and second sides;
      iii. a plurality of lobes extending away from the central opening, each of the lobes having a lobe opening extending between the first and second sides; and
   e. wherein the plurality of rotor plates are stacked and secured together to form the rotor assembly such that at least one of the first and second sides of one rotor plate is adjacent to and in contact with at least one of the first and second sides of another rotor plate; and wherein the rotor plates of each of the first and second rotor assemblies are rotated with respect to each other to form a helical rotor;
   f. wherein the rotary device is a volumetric fluid expansion device configured to receive exhaust gases from an internal combustion engine.

14. The rotary device of claim 13, wherein each of the rotor plates is formed from a material having a coefficient of thermal expansion that is less than a coefficient of thermal expansion of a material from which the housing is formed.

15. The rotary device of claim 13, wherein the rotor plates of the first rotor assembly are secured together by welding and wherein the rotor plates of the second rotor assembly are secured together by welding.

16. The rotary device of claim 13, wherein each of the plurality of rotor plates includes first, second, and third lobes that are radially spaced apart by an equal angular degree.

17. The rotary device of claim 16, wherein each of the plurality of rotor plates further includes a fourth lobe, wherein the first, second, third, and fourth lobes are radially spaced apart by an equal angular degree.

18. A method of making a laminated rotor and installing the rotor in the exhaust line of an internal combustion engine, the method comprising the steps of:
   a. forming a plurality of rotor plates from a steel sheet;
   b. providing the plurality of rotor plates, each of the plates having:
      i. a first side and a second opposite side;
      ii. a central opening extending between the first and second sides;
      iii. a plurality of lobes extending radially away from a central opening, each of the plurality of lobes having a convex outline and being separated by a root portion having a concave outline, wherein at least some of the plates have lobes with lobe openings;

c. stacking each of the plurality of rotor plates such that at least one of the first and second sides of each rotor plate is adjacent to a first or second side of another rotor plate;
d. securing the rotor plates together; and
e. inserting a shaft into the central openings of the rotor plates, wherein the step of inserting the shaft is performed after the step of securing the rotor plates together;
f. installing the rotors into the exhaust line of the internal combustion engine.

19. The method of making a laminated rotor of claim 18, wherein the step of securing the rotor plates together includes welding the rotor plates together.

20. The method of making a laminated rotor of claim 18, further including the step of burring the shaft before the step of inserting the shaft into the central openings of the rotor plates.

21. The method of making a laminated rotor of claim 18 further including the step of forming each of the plurality rotor plates by one of stamping, fine blanking, laser cutting, and water jet cutting.

\* \* \* \* \*